United States Patent
Chen et al.

(10) Patent No.: US 12,130,406 B2
(45) Date of Patent: Oct. 29, 2024

(54) METHOD FOR SNOWMELT FLOOD PREDICTION

(71) Applicants: TSINGHUA UNIVERSITY, Beijing (CN); BEIJING GLOBAL SAFETY TECHNOLOGY CO., LTD., Beijing (CN)

(72) Inventors: Tao Chen, Beijing (CN); Zhanhui Sun, Beijing (CN); Jianguo Chen, Beijing (CN); Yujia Miao, Beijing (CN); Guofeng Su, Beijing (CN); Quanyi Huang, Beijing (CN); Hongyong Yuan, Beijing (CN); Zhipeng Li, Beijing (CN); Xin Liu, Beijing (CN); Bingxu Hou, Beijing (CN); Zhiwei Shangguan, Beijing (CN); Lifan Zhang, Beijing (CN)

(73) Assignees: TSINGHUA UNIVERSITY, Beijing (CN); BEIJING GLOBAL SAFETY TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 17/788,771

(22) PCT Filed: Dec. 23, 2020

(86) PCT No.: PCT/CN2020/138686
§ 371 (c)(1),
(2) Date: Jun. 24, 2022

(87) PCT Pub. No.: WO2021/129680
PCT Pub. Date: Jul. 1, 2021

(65) Prior Publication Data
US 2023/0068671 A1 Mar. 2, 2023

(30) Foreign Application Priority Data
Dec. 26, 2019 (CN) .......................... 201911370633.0

(51) Int. Cl.
*G01W 1/10* (2006.01)

(52) U.S. Cl.
CPC ..................................... *G01W 1/10* (2013.01)

(58) Field of Classification Search
CPC ................................ G01W 1/10; Y02A 10/40
See application file for complete search history.

(56) References Cited

U.S. PATENT DOCUMENTS

2006/0167647 A1* 7/2006 Krumm ................... G01W 1/17
 702/130
2019/0316309 A1* 10/2019 Wani ...................... G06F 3/0484

FOREIGN PATENT DOCUMENTS

CN  108416049  8/2018

OTHER PUBLICATIONS

Liu, Yang; Meng, Xian-Yong; Liu, Zhi-Hui; Yu, Dan-Lin. Nature Environment and Pollution Technology; Karad vol. 14, Iss. 3, (Sep. 2015): 517-524. (Year: 2015).*

(Continued)

*Primary Examiner* — Yoshihisa Ishizuka
(74) *Attorney, Agent, or Firm* — Hodgson Russ LLP

(57) ABSTRACT

A method for predicting snowmelt flood is provided. The method includes: acquiring rain and snow fall distribution data in a target area in a preset time period, and extracting precipitation characteristic data according to the rain and snow fall distribution data; acquiring temperature distribution data in the target area, acquiring a target temperature and a corresponding target time according to the temperature distribution data, and determining temperature characteristic data according to the target temperature and the target time; and determining a snowmelt flood risk level in the target area according to the precipitation characteristic data and the temperature characteristic data.

16 Claims, 3 Drawing Sheets

---

101 — acquiring rain and snow fall distribution data in a target area in a preset time period, and extracting precipitation characteristic data according to the rain and snow fall distribution data 102 — acquiring temperature distribution data in the target area, acquiring a target temperature and a corresponding target time according to the temperature distribution data, and determining temperature characteristic data according to the target temperature and the target time 103 — determining a snowmelt flood risk level in the target area according to the precipitation characteristic data and the temperature characteristic data

(56) References Cited

OTHER PUBLICATIONS

Zeinivand, Hossein & Smedt, F . . . (2010). Prediction of snowmelt floods with a distributed hydrological model using a physical snow mass and energy balance approach. Natural Hazards. 54. 451-468. 10.1007/s11069-009-9478-9. (Year: 2010).*

WIPO, International Search Report for International Application No. PCT/CN2020/138686, Mar. 22, 2021.

* cited by examiner

METHOD FOR SNOWMELT FLOOD PREDICTION

CROSS-REFERENCE TO RELATED APPLICATIONS

This application is a U.S. national phase entry of International Application No. PCT/CN2020/138686, filed Dec. 23, 2020, which claims priority to Chinese Patent Application No. 201911370633.0, filed Dec. 26, 2019, the entire disclosures of which are incorporated herein by reference.

FIELD

The present disclosure relates to a field of safety technology, and more particularly to a method for predicting snowmelt flood, a device for predicting snowmelt flood, an electronic device and a storage medium.

BACKGROUND

There is generally a lot of snow on high mountains, and the snow may rapidly melt in a very short period of time under influence of various factors, which will lead to snowmelt flood. Therefore, for problems of snow melting in high mountains, there is a need to provide visual assistance for monitoring, early warning and emergency handling of flood disasters in areas with frequent snowmelt floods.

SUMMARY

In embodiments of a first aspect of the present disclosure, a method for predicting snowmelt flood is provided. The method includes: acquiring rain and snow fall distribution data in a target area in a preset time period, and extracting precipitation characteristic data according to the rain and snow fall distribution data; acquiring temperature distribution data in the target area, acquiring a target temperature and a corresponding target time according to the temperature distribution data, and determining temperature characteristic data according to the target temperature and the target time; and determining a snowmelt flood risk level in the target area according to the precipitation characteristic data and the temperature characteristic data.

In embodiments of a second aspect of the present disclosure, a device for predicting snowmelt flood is provided. The device includes: an acquisition and extraction module, configured to acquire rain and snow fall distribution data in a target area in a preset time period, and extract precipitation characteristic data according to the rain and snow fall distribution data; an acquisition and determination module, configured to acquire temperature distribution data in the target area, acquire a target temperature and a corresponding target time according to the temperature distribution data, and determine temperature characteristic data according to the target temperature and the target time; and a processing module, configured to determine a snowmelt flood risk level in the target area according to the precipitation characteristic data and the temperature characteristic data.

In embodiments of a third aspect of the present disclosure, an electronic device is provided. The electronic device includes a processor, and a memory for storing computer programs executable by the processor. The processor is configured to execute the computer programs to perform the method for predicting snowmelt flood according to the embodiments of the first aspect of the present disclosure.

In embodiments of a fourth aspect of the present disclosure, a computer-readable storage medium is provided. The computer-readable storage medium has stored therein computer programs that, when executed by a processor, cause the processor to perform the method for predicting snowmelt flood according to the embodiments of the first aspect of the present disclosure.

BRIEF DESCRIPTION OF THE DRAWINGS

These above and/or additional aspects and advantages of embodiments of the present disclosure will become apparent and more readily appreciated from the following descriptions made with reference to the drawings, in which.

DETAILED DESCRIPTION

Figure 1:
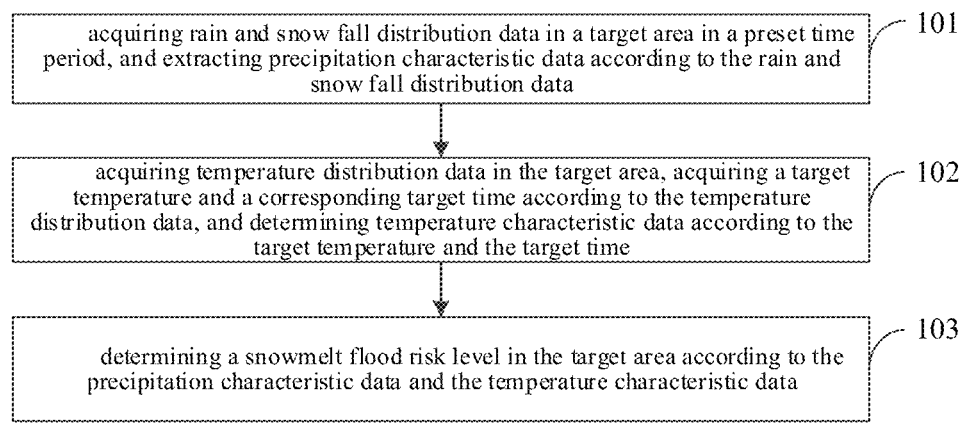
FIG. 1 is a flowchart of a method for predicting snowmelt flood in an embodiment of the present disclosure.

Embodiments of the present disclosure are described in detail below, examples of which are illustrated in the drawings, in which the same or similar reference numerals throughout the descriptions denote the same or similar elements or elements having the same or similar functions. The embodiments described herein with reference to drawings are explanatory, and used to generally understand the present disclosure. The embodiments shall not be construed to limit the present disclosure.

Embodiments of the present disclosure seek to solve at least one of the problems existing in the related art to at least some extent.

In order to achieve the above-mentioned object, the present disclosure provides a method for predicting snowmelt flood, which solves problems that snowmelt flood prediction cannot be performed in a related art. By combining current air temperature and precipitation conditions, a snowmelt flood risk within a long time in the future may be assessed and early warned, which may provide visual assistance for monitoring, early warning and emergency handling of flood disasters in areas with frequent snowmelt floods, and sense and prevent snowmelt flood disasters in advance.

The present disclosure provides a device for predicting snowmelt flood.

The present disclosure provides an electronic device.

The present disclosure provides a computer-readable storage medium.

A method for predicting snowmelt flood, a device for predicting snowmelt flood, an electronic device, and a storage medium according to the embodiments of the present disclosure will be described below with reference to the accompanying drawings.

FIG. 1 is a flowchart of a method for predicting snowmelt flood in an embodiment of the present disclosure.

As shown in FIG. 1, the method includes step 101 to step 103.

In step 101, rain and snow fall distribution data in a target area in a preset time period is acquired, and precipitation characteristic data is extracted according to the rain and snow fall distribution data.

In practical applications, a target area such as a whole area of Xinjiang province may be selected as the target area, or each county in Xinjiang province may be selected as the target area, which may be selected according to application needs.

Further, the rain and snow fall distribution data in the target area in the preset time period is acquired, such as the rain and snow fall distribution data in one month or two months. The preset time period may be set according to actual application needs, and the rain and snow fall distribution data includes one or more of the number of times of rainfalls, the number of times of snowfalls, a snow depth and a rain depth.

Specifically, the precipitation characteristic data may be extracted according to the rain and snow fall distribution data by the following examples.

In a first example, the number of times of rainfalls and the number of times of snowfalls in the target area in the preset time period are acquired, and the number of times of precipitation is acquired by summing the number of times of rainfalls and the number of times of snowfalls.

In a second example, a snow depth and a rain depth in each observation point in the target area are acquired, and an amount of precipitation is calculated based on the snow depth and the rain depth.

In step 102, temperature distribution data in the target area is acquired, a target temperature and a corresponding target time are acquired according to the temperature distribution data, and temperature characteristic data is determined according to the target temperature and the target time.

In practical applications, air temperature data in the target area is generally given by scattered weather stations, and thus it is necessary to process the air temperature data to obtain the rasterized temperature distribution. In addition, the temperature distribution data in the target area may be also acquired by providing a temperature sensor as required.

In an embodiment of the present disclosure, a plurality of station temperatures collected by a plurality of weather stations in the target area in the preset time period are acquired, and interpolation is performed on the plurality of the station temperatures according to an inverse distance weighted interpolation algorithm to generate temperature distribution raster data in the target area in the preset time period.

It could be understood that, in the temperature distribution data in the target area, a temperature that enables snow melting is determined as the target temperature, and a time corresponding to the target temperature is determined as the target time, thereby determining the temperature characteristic data according to the target temperature and the target time. In an embodiment, a temperature integration result of the target temperature over the target time is calculated according to a preset algorithm as the temperature distribution data.

In step 103, a snowmelt flood risk level is determined in the target area according to the precipitation characteristic data and the temperature characteristic data.

Specifically, the snowmelt flood risk level in the target area may be determined based on the different precipitation characteristic data and the different temperature characteristic data in different ways. In an embodiment, when the precipitation characteristic data is the number of times of precipitation and the temperature characteristic data is the temperature integration result, the number of times of precipitation is compared with a first preset threshold to obtain a first comparison result, the temperature integration result is compared with a second preset threshold to obtain a second comparison result, and the snowmelt flood risk level in the target area is determined according to the first comparison result and the second comparison result.

In the method for predicting snowmelt flood in some embodiments of the present disclosure, the rain and snow fall distribution data in the target area in the preset time period is acquired, and the precipitation characteristic data is extracted according to the rain and snow fall distribution data. The temperature distribution data in the target area is acquired, a target temperature and a corresponding target time are acquired according to the temperature distribution data, and temperature characteristic data is determined according to the target temperature and the target time. The snowmelt flood risk level in the target area is determined according to the precipitation characteristic data and the temperature characteristic data. In this way, by combining current air temperature and precipitation conditions, a snowmelt flood risk within a long time in the future may be assessed and early warned, which may provide visual assistance for monitoring, early warning and emergency handling of flood disasters in areas with frequent snowmelt floods, and sense and prevent snowmelt flood disasters in advance.

Figure 2:
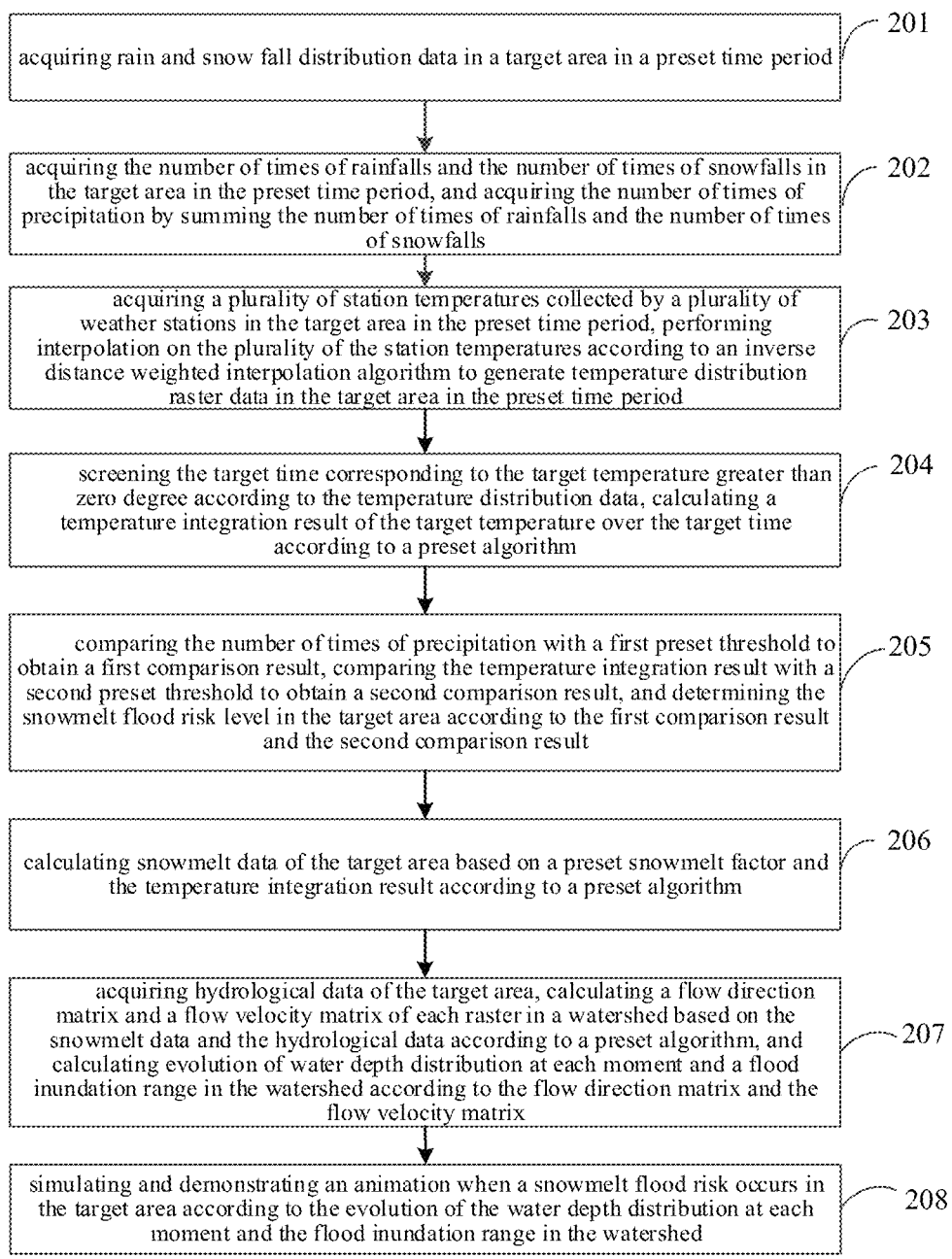
FIG. 2 is a flowchart of a method for predicting snowmelt flood in another embodiment of the present disclosure.

In order to realize the above-mentioned embodiments, the present disclosure also provides another method for predicting snowmelt flood. FIG. 2 is a flowchart of a method for predicting snowmelt flood in another embodiment of the present disclosure.

As shown in FIG. 2, the method includes step 201 to step 208.

In step 201, rain and snow fall distribution data in a target area in a preset time period is acquired.

In practical applications, a target area such as a whole area of Xinjiang province may be selected as the target area, or each county in Xinjiang province may be selected as the target area, which may be selected according to application needs.

Further, the rain and snow fall distribution data in the target area in the preset time period is acquired, such as the rain and snow fall distribution data in one month or two months. The preset time period may be set according to actual application needs, and the rain and snow fall distribution data includes one or more of the number of times of rainfalls, the number of times of snowfalls, a snow depth and a rain depth.

In step 202, the number of times of rainfalls and the number of times of snowfalls in the target area in the preset time period are acquired, and the number of times of precipitation is acquired by summing the number of times of rainfalls and the number of times of snowfalls.

Specifically, the number of times of rainfalls and the number of times of snowfalls in the target area in the preset time period are acquired, and the number of times of precipitation is acquired as precipitation characteristic data by summing the number of times of rainfalls and the number of times of snowfalls.

For example, the snowmelt flood risk from March to May in Xinjiang province may be analyzed according to an occurrence mechanism of snowmelt floods and an occurrence regularity of snowmelt floods in Xinjiang province in spring, in combination with historical weather data and case data of snowmelt floods in spring in Xinjiang province, through a comprehensive analysis of geographical features of various counties and weather information of the counties in spring in Xinjiang province, considering winter precipitation factors and temperature factors, and using a machine learning process.

For example, a cumulative number N of times of precipitation is used to reflect precipitation factor in winter. First, the number of times of precipitation (including snowfall and rainfall) in February of the current year in each county is read as NFeb, and the number of times of precipitation from March 1 to the current date is counted as NSpr. Thus, the cumulative number N of times of precipitation may be calculated, that is, N=NFeb+NSpr.

In step 203, a plurality of station temperatures collected by a plurality of weather stations in the target area in the preset time period are acquired, and interpolation is performed on the plurality of the station temperatures according to an inverse distance weighted interpolation algorithm to generate temperature distribution raster data in the target area in the preset time period.

Specifically, in the present disclosure, the inverse distance weighted interpolation algorithm is used to perform interpolation to obtain the temperature distribution raster data in the target area in the preset time period.

The interpolation process considers temperature change caused by the difference between an elevation (a height relative to the level) of each weather station and that of a point to be interpolated. In the troposphere, a temperature reduces by 6° C. to 7° C. with every 1 km increase on average, and 6.5° C. may be selected in an embodiment of the present disclosure. The interpolation formula is:

$$Z = \left(\sum_{i=1}^{n} \frac{Z_i + 6.5 \frac{h_i - h}{1\ km}}{d_i^m}\right) \Big/ \left(\sum_{i=1}^{n} \frac{1}{d_i^m}\right),$$

where Z represents a temperature at a point after interpolation, $Z_i$ represents a temperature at an $i^{th}$ weather station, $d_i$ represents a distance between the $i^{th}$ weather station and the point to be interpolated, m represents a distance factor, $h_i$ represents a height of the $i^{th}$ weather station, h represents a height of the point to be interpolated, and n represents the number of weather stations.

In step 204, the target time corresponding to the target temperature greater than zero degree is screened according to the temperature distribution data, and a temperature integration result of the target temperature over the target time is calculated according to a preset algorithm.

Specifically, in an embodiment of the present disclosure, an integral temperature T is selected to reflect temperature factor. In a definition of the integral temperature, it is assumed that variations of a daily minimum temperature $t_{min}$ to a daily maximum temperature $t_{max}$, and $t_{max}$ to $t_{min}$ are linear, and a daily temperature distribution of "$t_{min}$–$t_{max}$–$t_{min}$" is isosceles triangular distribution.

It could be understood that snowmelt occurs only when the temperature is greater than zero degree. The integral temperature T is defined as an integration result of part of a daily temperature distribution curve with a temperature greater than zero degree over the target time by an integration formula:

$$T = \begin{cases} 0, & \text{if } t_{max} < 0 \\ t_{max}^2 / 2(t_{max} - t_{min}) & \text{if } t_{min} < 0 < t_{max} \\ (t_{max} + t_{min})/2 & \text{if } t_{min} > 0 \end{cases},$$

where $t_{min}$ represents a minimum temperature, and $t_{max}$ represents a maximum temperature.

In step 205, the number of times of precipitation is compared with a first preset threshold to obtain a first comparison result, the temperature integration result is compared with a second preset threshold to obtain a second comparison result, and the snowmelt flood risk level in the target area is determined according to the first comparison result and the second comparison result.

Specifically, when the precipitation characteristic data is the number of times of precipitation, and the temperature characteristic data is the temperature integration result, for example, based on two variables such as a cumulative number N of times of precipitation and the temperature integration result T, a risk model of the snowmelt floods in spring in counties in northern Xinjiang may be established. Based on collected flood cases, the first threshold Ncri and the second threshold Tcri are respectively set for N and T, and N and T in a certain county on a certain day may be obtained according to the meteorological temperature data.

Specifically, (i) if N<½Ncri and T=0, the flood risk level is none; (ii) if N<Ncri and T<Tcri, the flood risk level is low; (iii) if N>Ncri and T<Tcri, or if N<Ncri and T>Tcri, the flood risk level is medium; (iv) if N>Ncri and T>Tcri, the flood risk level is high. If no flood occurs after the risk level reaches high, the flood risk level remains high until a flood occurs. The first threshold Ncri and the second threshold Tcri of each county in northern Xinjiang may be obtained by a machine learning process using historical data of snowmelt flood cases in Xinjiang in spring.

It should be noted that, using the machine learning process, the model parameters may be dynamically updated through continuous addition of new data.

In step 206, snowmelt data of the target area is calculated based on a preset snowmelt factor and the temperature integration result according to a preset algorithm.

Specifically, based on the rain depth and snow water equivalent distribution data obtained by remote sensing, snow cover density distribution raster data in the target area is obtained.

Based on the temperature integration result and the snow cover density distribution raster data, using a classical degree-day factor method, predicted snowmelt data is calculated and output.

Specifically, the number of degree-days (NDD) characterizes energy absorbed by the snow cover. When the temperature distribution (Ti) measured hourly every day is known, NDD may be obtained by calculating an arithmetic mean. In the calculation, if the temperature is a negative value, the temperature is replaced with 0° C., and the formula is:

$$NDD = \frac{\sum_{i=1}^{n} T_i}{n} (T_i \geq 0),$$

where $T_i$ represents a temperature on an $i^{th}$ hour of a day, and n represents the number of hours of the day.

If there is no above-mentioned temperature integration result, and a daily maximum temperature $t_{min}$ and a daily minimum temperature $t_{max}$ are known, it is assumed that variations of a daily minimum temperature $t_{min}$ to a daily maximum temperature $t_{max}$, and $t_{max}$ to $t_{min}$ are linear. NDD may be calculated by the following formula:

$$NDD = \begin{cases} 0, & \text{if } T_{max} < 0 \\ T_{max}^2 / 2(T_{max} - T_{min}) & \text{if } T_{min} < 0 < T_{max} \\ (T_{max} + T_{min})/2 & \text{if } T_{min} > 0 \end{cases}.$$

The snowmelt data (SM) is proportional to NDD, that is SM=a·NDD, where a represents a degree-day factor (DDF). a is related to a density of snow ($\rho_S$) and a density of water ($\rho_W$) with a calculation formula:

$$a = 1.1\left(\frac{\rho_S}{\rho_W}\right).$$

In step 207, hydrological data of the target area is acquired, a flow direction matrix and a flow velocity matrix of each raster in a watershed are calculated based on the snowmelt data and the hydrological data according to a preset algorithm, and evolution of water depth distribution at each moment and a flood inundation range in the watershed are calculated according to the flow direction matrix and the flow velocity matrix.

In step 208, an animation when a snowmelt flood risk occurs in the target area is simulated and demonstrated according to the evolution of the water depth distribution at each moment and the flood inundation range in the watershed.

Specifically, using the snowmelt data in the target area, in combination with the hydrological data in the target area such as DEM elevation data in a watershed, current water depth data and hydrological data in the watershed, the flow direction matrix of each raster in the watershed may be obtained using a D8 process and a steepest slope process, and the flow velocity matrix may be obtained by using the Manning's formula.

In this way, hydrological models such as rivers, lakes and reservoirs are added, such that the impact of the above hydrological characteristics on surface flood transporting is considered in terms of initial water depth, water flow direction and water flow speed.

Finally, the evolution of the water depth distribution at each moment is calculated according to the flow direction matrix and the flow velocity matrix, and the flood inundation range in the watershed is analyzed according to the water depth distribution in the watershed. Therefore, the method for predicting snowmelt flood according to an embodiment of the present disclosure may be used for risk prediction, remote sensing monitoring and flood evolution. The risk prediction includes snowmelt flood risk prediction and snowmelt amount prediction, the remote sensing monitoring includes weather information display and snow cover information display, and the flood evolution includes flood runoff simulation and point selection query. The above-mentioned functions may be combined to realize normal monitoring and risk warning of snowmelt floods.

In this way, with the method for predicting snowmelt flood according to an embodiment of the present disclosure, it is possible to realize snowmelt flood risk prediction, snowmelt volume prediction and flood runoff trend simulation in a specific area, and track the whole process of snowmelt flood disasters, which may provide visual assistance for monitoring, early warning and emergency handling of flood disasters in areas with frequent snowmelt floods, and sense and prevent snowmelt flood disasters in advance.

In the method for predicting snowmelt flood in some embodiments of the present disclosure, the rain and snow fall distribution data in the target area in the preset time period is acquired. The number of times of rainfalls and the number of times of snowfalls in the target area in the preset time period are acquired, and the number of times of precipitation is acquired by summing the number of times of rainfalls and the number of times of snowfalls. A plurality of station temperatures collected by a plurality of weather stations in the target area in the preset time period are acquired, and interpolation is performed on the plurality of the station temperatures according to an inverse distance weighted interpolation algorithm to generate temperature distribution raster data in the target area in the preset time period. The target time corresponding to the target temperature greater than zero degree is screened according to the temperature distribution data, and a temperature integration result of the target temperature over the target time is calculated according to a preset algorithm. The number of times of precipitation is compared with a first preset threshold to obtain a first comparison result, the temperature integration result is compared with a second preset threshold to obtain a second comparison result, and the snowmelt flood risk level in the target area is determined according to the first comparison result and the second comparison result. Snowmelt data of the target area is calculated based on preset snowmelt factor and the temperature integration result according to a preset algorithm. Hydrological data of the target area is acquired, the snowmelt data and the hydrological data are calculated according to a preset algorithm to obtain a flow direction matrix and a flow velocity matrix of each raster in a watershed, and evolution of water depth distribution at each moment and a flood inundation range in the watershed are calculated according to the flow direction matrix and the flow velocity matrix. In this way, by combining current air temperature and precipitation conditions, a snowmelt flood risk within a long time in the future may be assessed and early warned, which may provide visual assistance for monitoring, early warning and emergency handling of flood disasters in areas with frequent snowmelt floods, and sense and prevent snowmelt flood disasters in advance.

Figure 3:
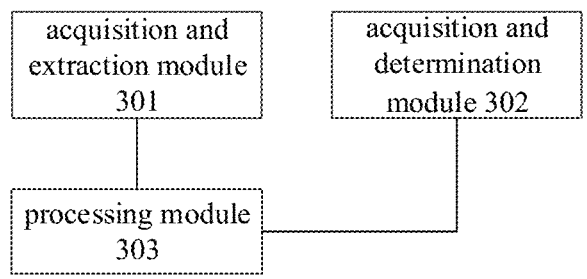
FIG. 3 is a schematic diagram showing a device for predicting snowmelt flood in an embodiment of the present disclosure.

In order to realize the above-mentioned embodiments, the present disclosure also provides a device for predicting snowmelt flood. FIG. 3 is a schematic diagram showing a device for predicting snowmelt flood in an embodiment of the present disclosure.

As shown in FIG. 3, the device includes an acquisition and extraction module 301, an acquisition and determination module 302 and a processing module 303.

The acquisition and extraction module 301 is configured to acquire rain and snow fall distribution data in a target area in a preset time period, and extract precipitation characteristic data according to the rain and snow fall distribution data.

The acquisition and determination module 302 is configured to acquire temperature distribution data in the target area, acquire a target temperature and a corresponding target time according to the temperature distribution data, and determine temperature characteristic data according to the target temperature and the target time.

The processing module 303 is configured to determine a snowmelt flood risk level in the target area according to the precipitation characteristic data and the temperature characteristic data.

Furthermore, in an embodiment of the present disclosure, the acquisition and extraction module 301 is configured to acquire the number of times of rainfalls and the number of times of snowfalls in the target area in the preset time period, and acquire the number of times of precipitation by summing the number of times of rainfalls and the number of times of snowfalls. Alternatively, the acquisition and extraction module 301 is also configured to acquire a snow depth and a rain depth in each observation point in the target area, and calculate an amount of precipitation based on the snow depth and the rain depth.

Furthermore, in an embodiment of the present disclosure, the acquisition and determination module 302 is configured to acquire a plurality of station temperatures collected by a plurality of weather stations in the target area in the preset time period, perform interpolation on the plurality of the station temperatures according to an inverse distance weighted interpolation algorithm to generate temperature distribution raster data in the target area in the preset time period, screen the target time corresponding to the target temperature greater than zero degree according to the temperature distribution data, and calculate a temperature integration result of the target temperature over the target time according to a preset algorithm.

Specifically, interpolation is performed on the plurality of the station temperatures by an interpolation formula to generate the temperature distribution raster data in the target area in the preset time period. The interpolation formula is $$Z = \left(\sum_{i=1}^{n} \frac{Z_i + 6.5 \frac{h_i - h}{1 \text{ km}}}{d_i^m}\right) \Big/ \left(\sum_{i=1}^{n} \frac{1}{d_i^m}\right);$$

where Z represents a temperature at a point after interpolation, $Z_i$ represents a temperature at an $i^{th}$ weather station, $d_i$ represents a distance between the $i^{th}$ weather station and the point to be interpolated, m represents a distance factor, $h_i$ represents a height of the $i^{th}$ weather station, h represents a height of the point to be interpolated, and n represents the number of weather stations.

Calculating the temperature integration result of the target temperature over the target time according to the preset algorithm includes calculating the temperature integration result of the target temperature over the target time by an integration formula:

$$T = \begin{cases} 0, & \text{if } t_{max} < 0 \\ t_{max}^2 / 2(t_{max} - t_{min}) & \text{if } t_{min} < 0 < t_{max} \\ (t_{max} + t_{min})/2 & \text{if } t_{min} > 0 \end{cases}$$

where $t_{min}$ represents a minimum temperature, and $t_{max}$ represents a maximum temperature.

Furthermore, in an embodiment of the present disclosure, when the precipitation characteristic data is the number of times of precipitation, and the temperature characteristic data is the temperature integration result, the processing module 303 is configured to compare the number of times of precipitation with a first preset threshold to obtain a first comparison result, compare the temperature integration result with a second preset threshold to obtain a second comparison result, and determine the snowmelt flood risk level in the target area according to the first comparison result and the second comparison result.

Furthermore, in an embodiment of the present disclosure, after calculating the temperature integration result of the target temperature over the target time according to the preset algorithm, the processing module 303 is further configured to calculate snowmelt data of the target area based on a preset snowmelt factor and the temperature integration result according to a preset algorithm. The preset algorithm includes:

SM=a·NDD;

where SM represents snowmelt data, NDD represents an energy absorbed by snow cover, and a represents a degree-day factor (DDF).

a is related to a density of snow ($\rho_S$) and a density of water ($\rho_W$) with a calculation formula:

$$a = 1.1\left(\frac{\rho_S}{\rho_W}\right).$$

Furthermore, in an embodiment of the present disclosure, after calculating the snowmelt data of the target area, the processing module 303 is further configured to acquire hydrological data of the target area, calculate a flow direction matrix and a flow velocity matrix of each raster in a watershed based on the snowmelt data and the hydrological data according to a preset algorithm, and calculate evolution of water depth distribution at each moment and a flood inundation range in the watershed according to the flow direction matrix and the flow velocity matrix.

Furthermore, in an embodiment of the present disclosure, after calculating the evolution of the water depth distribution at each moment and the flood inundation range in the watershed according to the flow direction matrix and the flow velocity matrix, the processing module 303 is further configured to simulate and demonstrate an animation when a snowmelt flood risk occurs in the target area according to the evolution of the water depth distribution at each moment and the flood inundation range in the watershed.

It should be noted that the above-mentioned explanations of the method embodiments are also applicable to the device embodiments, which will be not repeated here in detail.

In the device for predicting snowmelt flood in some embodiments of the present disclosure, the rain and snow fall distribution data in the target area in the preset time period is acquired, and the precipitation characteristic data is extracted according to the rain and snow fall distribution data. The temperature distribution data in the target area is acquired, a target temperature and a corresponding target time are acquired according to the temperature distribution data, and temperature characteristic data is determined according to the target temperature and the target time. The snowmelt flood risk level in the target area is determined according to the precipitation characteristic data and the temperature characteristic data. In this way, by combining current air temperature and precipitation conditions, a snowmelt flood risk within a long time in the future may be assessed and early warned, which may provide visual assistance for monitoring, early warning and emergency handling of flood disasters in areas with frequent snowmelt floods, and sense and prevent snowmelt flood disasters in advance.

In order to realize the above-mentioned embodiments, the present disclosure also provides an electronic device. The electronic device includes a processor, and a memory for storing computer programs executable by the processor. The processor is configured to execute the computer programs to perform the method for predicting snowmelt flood according to the above-mentioned embodiments of the present disclosure.

In order to realize the above-mentioned embodiments, the present disclosure also provides a computer-readable storage medium, having stored therein computer programs that, when executed by a processor, cause the processor to perform the method for predicting snowmelt flood according to the above-mentioned embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above-mentioned phrases throughout this specification are not necessarily referring to the same embodiment or example of the present disclosure. Furthermore, the particular features, structures, materials, or characteristics may be combined in any suitable manner in one or more embodiments or examples. In addition, without conflicting with each other, those skilled in the art may combine and integrate the different embodiments or examples described in the specification, as well as the features of the different embodiments or examples.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means at least two, such as two or three, unless specified otherwise.

Any process or method described in a flow chart or described herein in other ways may be understood to include one or more modules, segments or portions of codes of executable instructions for achieving specific logical functions or steps in the process. In addition, the scope of a preferred embodiment of the present disclosure includes other implementations, in which the functions may be performed out of the order shown or discussed, including substantially concurrently or in the reverse order depending on the functions involved, which should be understood by those skilled in the art.

The logic and/or step shown in the flow chart or described in other manners herein, for example, a particular sequence table of executable instructions for realizing the logical function, may be specifically achieved in any computer readable medium to be used by the instruction execution system, device or equipment (such as the system based on computers, the system including processors or other systems capable of obtaining an instruction from the instruction execution system, device and equipment and executing the instruction), or to be used in combination with the instruction execution system, device and equipment. As to the specification, "the computer readable medium" may be any device capable of including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon. This is because, for example, the paper or other appropriate medium may be optically scanned and then edited, decrypted or processed with other appropriate methods when necessary to obtain the programs in an electric manner, and then the programs may be stored in a computer memory.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if they are realized by the hardware, likewise in another embodiment, the steps or methods may be realized by any one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or part of the steps in the above exemplary method of the present disclosure may be achieved by commanding the related hardware with programs. The programs may be stored in a computer readable storage medium, and the programs include one or a combination of the steps in the method embodiments of the present disclosure when running on a computer.

In addition, each functional cell of the embodiments of the present disclosure may be integrated in a processing module, or these cells may be separate physical existence, or two or more cells are integrated in a processing module. The integrated module may be realized in a form of hardware or in a form of software functional modules. When the integrated module is realized in a form of software functional module and is sold or used as a standalone product, the integrated module may be stored in a computer readable storage medium.

The storage medium mentioned above may be read-only memories, magnetic disks, compact disks (CD), etc.

Although explanatory embodiments have been shown and described above, it would be appreciated by those skilled in the art that the above embodiments cannot be construed to limit the present disclosure, and changes, variations, alternatives, and modifications can be made in the embodiments without departing from the scope of the present disclosure.

What is claimed is:

1. A method performed by an electronic device for predicting snowmelt flood, comprising:
   acquiring rain and snow fall distribution data in a target area in a preset time period, and extracting precipitation characteristic data according to the rain and snow fall distribution data;
   acquiring temperature distribution data in the target area, acquiring a target temperature and a corresponding target time according to the temperature distribution data, and determining temperature characteristic data according to the target temperature and the target time;
   determining a snowmelt flood risk level in the target area according to the precipitation characteristic data and the temperature characteristic data; and
   generating an animation to simulate a future snowmelt flood in the target area according to the snowmelt flood risk level;
   wherein acquiring the temperature distribution data in the target area comprises:
   acquiring a plurality of station temperatures collected by a plurality of weather stations in the target area in the preset time period; and
   performing interpolation on the plurality of station temperatures according to an inverse distance weighted interpolation algorithm to generate temperature distribution raster data in the target area in the preset time period;

wherein performing interpolation on the plurality of the station temperatures according to the inverse distance weighted interpolation algorithm to generate temperature distribution raster data in the target area in the preset time period comprises:

performing interpolation on the plurality of the station temperatures by an interpolation formula to generate the temperature distribution raster data in the target area in the preset time period, wherein the interpolation formula is:

$$Z = \left( \sum_{i=1}^{n} \frac{Z_i + 6.5 \frac{h_i - h}{1 \text{ km}}}{d_i^m} \right) \bigg/ \left( \sum_{i=1}^{n} \frac{1}{d_i^m} \right),$$

where Z represents a temperature at a point after interpolation, $Z_i$ represents a temperature at an $i^{th}$ weather station, $d_i$ represents a distance between the $i^{th}$ weather station and the point to be interpolated, m represents a distance factor, $h_i$ represents a height of the $i^{th}$ weather station, h represents a height of the point to be interpolated, and n represents the number of weather stations.

2. The method according to claim 1, wherein extracting precipitation characteristic data according to the rain and snow fall distribution data comprises any one of:

acquiring the number of times of rainfalls and the number of times of snowfalls in the target area in the preset time period, and acquiring the number of times of precipitation by summing the number of times of rainfalls and the number of times of snowfalls; and acquiring a snow depth and a rain depth in each observation point in the target area, and calculating an amount of precipitation based on the snow depth and the rain depth.

3. The method according to claim 2, wherein acquiring the target temperature and the corresponding target time according to the temperature distribution data, and determining temperature characteristic data according to the target temperature and the target time, comprises:

screening the target time corresponding to the target temperature greater than zero degree according to the temperature distribution data; and calculating a temperature integration result of the target temperature over the target time according to a preset algorithm.

4. The method according to claim 3, wherein calculating the temperature integration result of the target temperature over the target time according to the preset algorithm comprises:

calculating the temperature integration result of the target temperature over the target time by an integration formula:

$$T = \begin{cases} 0, & \text{if } t_{max} < 0 \\ t_{max}^2 / 2(t_{max} - t_{min}) & \text{if } t_{min} < 0 < t_{max} \\ (t_{max} + t_{min})/2 & \text{if } t_{min} > 0 \end{cases},$$

where T represents an integral temperature, $t_{min}$ represents a minimum temperature, and $t_{max}$ represents a maximum temperature.

5. The method according to claim 3, wherein when the precipitation characteristic data is the number of times of precipitation, and the temperature characteristic data is the temperature integration result, determining the snowmelt flood risk level in the target area according to the precipitation characteristic data and the temperature characteristic data comprises:

comparing the number of times of precipitation with a first preset threshold to obtain a first comparison result;

comparing the temperature integration result with a second preset threshold to obtain a second comparison result; and determining the snowmelt flood risk level in the target area according to the first comparison result and the second comparison result.

6. The method according to claim 4, wherein after calculating the temperature integration result of the target temperature over the target time according to the preset algorithm, the method further comprises:

calculating snowmelt data of the target area based on a preset snowmelt factor and the temperature integration result by a formula:

$$SM = a \cdot NDD;$$

where SM represents snowmelt data, NDD represents an energy absorbed by snow cover, and a represents a degree-day factor (DDF);

wherein a is related to a density of snow (ρs) and a density of water (ρw) with a calculation formula:

$$a = 1.1 \left( \frac{\rho_S}{\rho_W} \right).$$

7. The method according to claim 6, wherein after calculating the snowmelt data of the target area, the method further comprises:

acquiring hydrological data of the target area;

calculating a flow direction matrix and a flow velocity matrix of each raster in a watershed based on the snowmelt data and the hydrological data; and calculating evolution of water depth distribution at each moment and a flood inundation range in the watershed according to the flow direction matrix and the flow velocity matrix.

8. The method according to claim 6, wherein NDD is obtained by a formula:

$$NDD = \frac{\sum_{i=1}^{n} T_i}{n} (T_i \geq 0),$$

where $T_i$ represents a temperature on an $i^{th}$ hour of a day, and n represents the number of hours of the day.

9. The method according to claim 7, wherein generating the animation to simulate the future snowmelt flood in the target area according to the snowmelt flood risk level comprises:

generating the animation to simulate the future snowmelt flood in the target area according to the evolution of the water depth distribution at each moment and the flood inundation range in the watershed.

10. An electronic device, comprising:
a processor; and
a memory for storing computer programs executable by the processor;
wherein the processor is configured to:
acquire rain and snow fall distribution data in a target area in a preset time period, and extract precipitation characteristic data according to the rain and snow fall distribution data;
acquire temperature distribution data in the target area, acquire a target temperature and a corresponding target time according to the temperature distribution data, and determine temperature characteristic data according to the target temperature and the target time;
determine a snowmelt flood risk level in the target area according to the precipitation characteristic data and the temperature characteristic data; and
generate an animation to simulate a future snowmelt flood in the target area according to the snowmelt flood risk level;
wherein the processor is further configured to:
acquire a plurality of station temperatures collected by a plurality of weather stations in the target area in the preset time period; and
perform interpolation on the plurality of the station temperatures according to an inverse distance weighted interpolation algorithm to generate temperature distribution raster data in the target area in the preset time period;
wherein the processor is further configured to:
perform interpolation on the plurality of the station temperatures by an interpolation formula to generate the temperature distribution raster data in the target area in the preset time period, wherein the interpolation formula is:

$$Z = \left( \sum_{i=1}^{n} \frac{Z_i + 6.5 \frac{h_i - h}{1 \text{ km}}}{d_i^m} \right) \bigg/ \left( \sum_{i=1}^{n} \frac{1}{d_i^m} \right),$$

where Z represents a temperature at a point after interpolation, $Z_i$ represents a temperature at an $i^{th}$ weather station, di represents a distance between the $i^{th}$ weather station and the point to be interpolated, m represents a distance factor, $h_i$ represents a height of the $i^{th}$ weather station, h represents a height of the point to be interpolated, and n represents the number of weather stations.

11. The device according to claim 10, wherein the processor is configured to perform any one of:
acquiring the number of times of rainfalls and the number of times of snowfalls in the target area in the preset time period, and acquiring the number of times of precipitation by summing the number of times of rainfalls and the number of times of snowfalls; and
acquiring a snow depth and a rain depth in each observation point in the target area, and calculating an amount of precipitation based on the snow depth and the rain depth.

12. The device according to claim 11, wherein the processor is configured to:
screen the target time corresponding to the target temperature greater than zero degree according to the temperature distribution data; and
calculate a temperature integration result of the target temperature over the target time according to a preset algorithm.

13. The device according to claim 12, wherein the processor is configured to:
calculate the temperature integration result of the target temperature over the target time by an integration formula:

$$T = \begin{cases} 0, & \text{if } t_{max} < 0 \\ t_{max}^2 / 2(t_{max} - t_{min}) & \text{if } t_{min} < 0 < t_{max} \\ (t_{max} + t_{min})/2 & \text{if } t_{min} > 0 \end{cases},$$

where T represents an integral temperature, tmin represents a minimum temperature, and tmax represents a maximum temperature.

14. The device according to claim 12, wherein when the precipitation characteristic data is the number of times of precipitation, and the temperature characteristic data is the temperature integration result, the processor is configured to:
compare the number of times of precipitation with a first preset threshold to obtain a first comparison result;
compare the temperature integration result with a second preset threshold to obtain a second comparison result; and
determine the snowmelt flood risk level in the target area according to the first comparison result and the second comparison result.

15. The device according to claim 13, wherein the processor is further configured to:
calculate snowmelt data of the target area based on a preset snowmelt factor and the temperature integration result by a formula:

$SM = a \cdot NDD;$ where SM represents snowmelt data, NDD represents an energy absorbed by snow cover, and a represents a degree-day factor (DDF);
wherein a is related to a density of snow ($\rho s$) and a density of water ($\rho w$) with a calculation formula:

$$a = 1.1 \left( \frac{\rho_S}{\rho_W} \right),$$

wherein NDD is obtained by a formula:

$$NDD = \frac{\sum_{i=1}^{n} T_i}{n} (T_i \geq 0),$$

where Ti represents a temperature on an $i^{th}$ hour of a day, and n represents the number of hours of the day.

16. A non-transitory computer-readable storage medium, having stored therein computer programs that, when executed by a processor, cause the processor to:
acquire rain and snow fall distribution data in a target area in a preset time period, and extract precipitation characteristic data according to the rain and snow fall distribution data;
acquire temperature distribution data in the target area, acquire a target temperature and a corresponding target time according to the temperature distribution data, and determine temperature characteristic data according to the target temperature and the target time;

determine a snowmelt flood risk level in the target area according to the precipitation characteristic data and the temperature characteristic data; and generate an animation to simulate a future snowmelt flood in the target area according to the snowmelt flood risk level;

wherein the processor is further caused to:

acquire a plurality of station temperatures collected by a plurality of weather stations in the target area in the preset time period; and perform interpolation on the plurality of the station temperatures according to an inverse distance weighted interpolation algorithm to generate temperature distribution raster data in the target area in the preset time period;

wherein the processor is further configured to:

perform interpolation on the plurality of the station temperatures by an interpolation formula to generate the temperature distribution raster data in the target area in the preset time period, wherein the interpolation formula is:

$$Z = \left(\sum_{i=1}^{n} \frac{Z_i + 6.5\frac{h_i - h}{1 \text{ km}}}{d_i^m}\right) \bigg/ \left(\sum_{i=1}^{n} \frac{1}{d_i^m}\right),$$

where Z represents a temperature at a point after interpolation, $Z_i$ represents a temperature at an $i^{th}$ weather station, $d_i$ represents a distance between the $i^{th}$ weather station and the point to be interpolated, m represents a distance factor, $h_i$ represents a height of the ith weather station, h represents a height of the point to be interpolated, and n represents the number of weather stations.

* * * * *